No. 776,945. PATENTED DEC. 6, 1904.
E. G. RIEDEL.
MEAT TENDERER, ALSO VEGETABLE CUTTER.
APPLICATION FILED JULY 8, 1903.
NO MODEL.

Witnesses:
Max Mayer.
Arthur Walther.

Inventor:
Ernst Guido Riedel
by: F. A. Koppen
Attorney

No. 776,945.

Patented December 6, 1904.

UNITED STATES PATENT OFFICE.

ERNST GUIDO RIEDEL, OF EINSIEDEL, NEAR CHEMNITZ, GERMANY.

MEAT-TENDERER, ALSO VEGETABLE-CUTTER.

SPECIFICATION forming part of Letters Patent No. 776,945, dated December 6, 1904.

Application filed July 8, 1903. Serial No. 164,731. (No model.)

*To all whom it may concern:*

Be it known that I, ERNST GUIDO RIEDEL, watchmaker, a subject of the King of Saxony, residing at Einsiedel, near Chemnitz, in the Kingdom of Saxony, German Empire, have invented a new and useful Improvement in Meat-Tenderers, also Vegetable-Cutters, of which the following is a full and clear specification.

As is well known, special tools for pricking or cutting meat in slices and the like are now coming into use, in which a series of steel star-wheels are mounted to turn on an axle provided with a handle. These star-wheels prick with their sharp points the meat and render a beating of the same unnecessary. During moving the tool over the meat, however, it is unavoidable that the latter will adhere to the points of the star-wheel and get entangled thereon.

The tool is illustrated in the accompanying drawings, in which—

Figure 1:
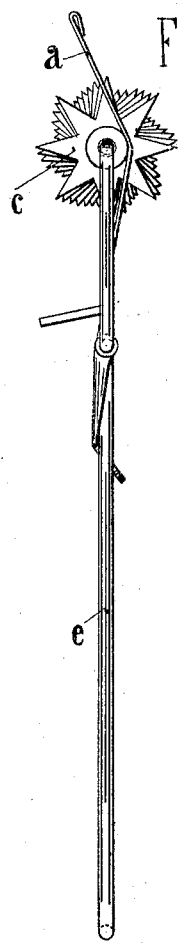
Figure 2:
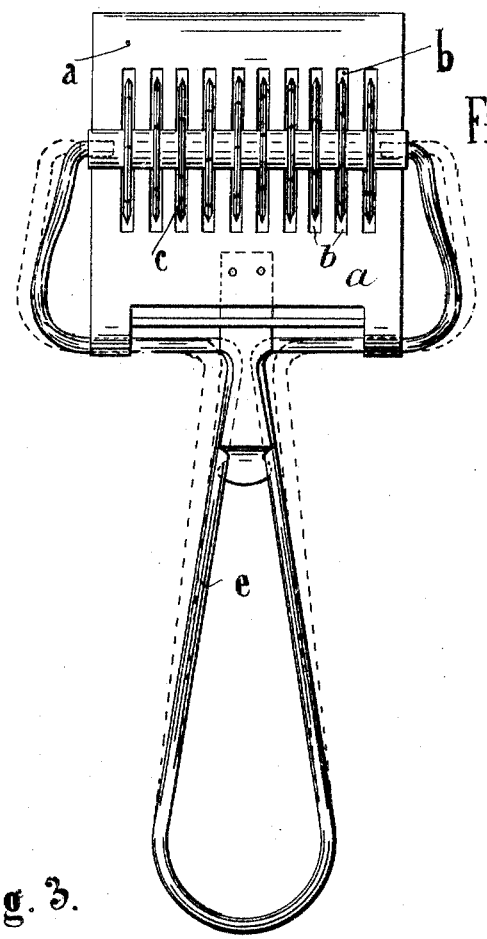
Figure 3:
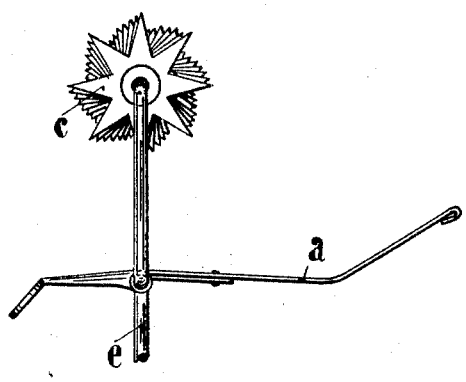

Figure 1 is a side view of the tool ready for use. Fig. 2 is a front view of the same, and Fig. 3 is a side view of the same to show how the deflecting-screen can be turned off.

In order to avoid this entanglement, according to my invention the tool is provided with a deflecting-screen $a$, which has slots $b$, into which the star-wheels $c$ engage and within which they can revolve. This deflecting-screen reaches beyond the axis of the star-wheels, and thus it completely incloses the star-wheels, so that it will keep off the meat. The axle of the star-wheels $c$ is formed by a tube $d$, into the ends of which take the ends of the correspondingly-bent handle $e$. The middle portion of the handle, which extends parallel to the tube $d$, forms the axle for the screen, so that this latter may be swung back in the manner shown in Fig. 3.

Having now described my invention, what I wish to secure by Letters Patent of the United States is—

A meat-tenderer, comprising a handle, an axle revolubly secured thereto, and carrying rotary cutters, a deflecting-screen hinged to the handle to swing to and from the axle and provided with slots for the cutters to pass through, and means to secure said screen in its position near the axle.

In witness whereof I have hereunto set my hand in presence of two witnesses.

ERNST GUIDO RIEDEL.

Witnesses:
 E. C. MEYER,
 C. RACHLITZ.